April 8, 1958 R. W. SPENCER ET AL 2,830,197

STABILIZED AMPLIFIER DEVICES

Filed April 7, 1955

INVENTORS
RICHARD W. SPENCER
THEODORE H. BONN

BY Charles C. English
AGENT 2,830,197

STABILIZED AMPLIFIER DEVICES

Richard W. Spencer and Theodore H. Bonn, Philadelphia, Pa., assignors, by mesne assignments, to Sperry Rand Corporation, New York, N. Y., a corporation of Delaware Application April 7, 1955, Serial No. 499,822

22 Claims. (Cl. 307—88)

Figure 1:
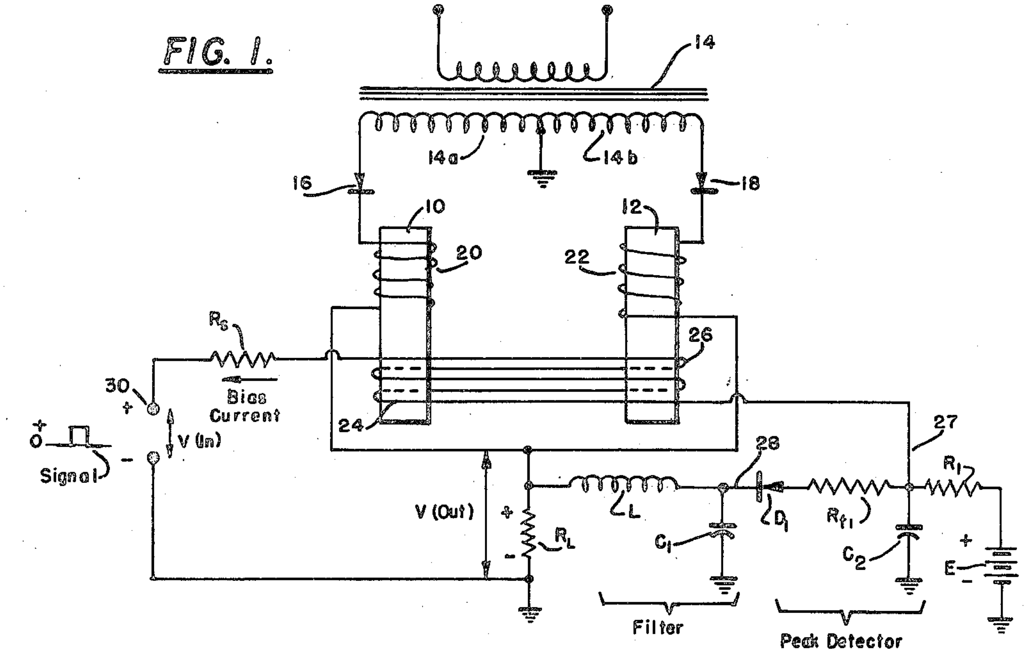

The present invention relates to stabilized amplifier circuits, and is more particularly concerned with a novel carrier-type magnetic amplifier providing a stabilized no-signal output voltage which is relatively independent of the duty cycle of input pulses coupled to the said amplifier. In particular, the present invention relates to a novel feed-back network for use in such carrier-type magnetic amplifiers of either single core or multiple core construction, or in other forms of amplifier devices, for effecting the foregoing zero-signal output stabilization.

Carrier-type magnetic amplifiers have, in the past, taken several possible forms of construction, including both single and multiple cores. One of the most useful of these known forms, where a component of output at the signal frequency is required, is the series self-saturating type amplifier, and such amplifiers may comprise a circuit so arranged that load current flows through a diode in series with one winding on each core utilized, thereby to aid the signal in saturating the said core. One or more cores may be used, each of which is coupled to a separate source of carrier voltage and to a common load, and the carrier voltage is in general so phased that the intervals between the starts of conduction between successive core windings are equal. In a typical amplifier utilizing two cores, in accordance with the foregoing concepts, each of the said pair of cores may carry a power winding thereon coupled respectively at one of their ends to sources of alternating carrier potential respectively 180° out of phase; and the other ends of the said power winding may be coupled to a load device. The two cores further carry either a single common signal winding, or separate signal windings connected in series with one another, and the said signal winding or windings are in turn selectively energized by a single source.

In operation, the cores of such a two-core self-saturating carrier type magnetic amplifier are caused to traverse their respective hysteresis loops by application of the said carrier potentials in conjunction with the operation of preselected bias potentials, preferably coupled to the said signal winding or windings, and this traverse is so effected that, at minimum output, when one of the said cores is at its minus remanence operating point the other of the said cores is at its plus remanence operating point. As a result of this operation, each one of the said cores is alternately in such an operating condition that it tends to reset the other of the said cores through the signal windings mentioned previously. The bias currents mentioned previously effectively add to the signal current, and are used in order that the gain and response characteristics, which are not linear functions of the input or bias, may be optimum for the expected amplitude and polarity of the input signals. Thus, an input signal produces an increment of output which adds to or subtracts from the quiescent or no-signal output of such an amplifier whereby, by appropriate choice of the bias potential utilized, the amplifier no-signal output potential may assume any value between minimum and maximum amplifier output.

When such an amplifier is employed, it is highly desirable to provide means stabilizing the no-signal output voltage of the said amplifier, and this stabilization should in turn be relatively independent of the duty cycle of input pulses. The present invention thus finds particular utility in carrier-type magnetic amplifiers used for amplifying random duty cycle unidirectional pulses, and in providing for the desired stabilization, amplifiers in accordance with the present invention have their zero-signal output potential stabilized against changes in component values or supply voltage variations by means of a non-linear feedback circuit.

It is accordingly an object of the present invention to provide a novel magnetic amplifier circuit.

A further object of the present invention resides in the provision of a novel magnetic amplifier circuit of the carrier-type.

Still another object of the present invention resides in the provision of a stabilized magnetic amplifier employing a non-linear feedback circuit.

A further object of the present invention resides in the provision of a carrier-type magnetic amplifier having its zero-signal output voltage stabilized against changes in component values or supply voltage variations.

Still another object of the present invention resides in the provision of an amplifier capable of utilization at random duty cycles or at high duty cycles, which amplifier further includes means providing zero-signal output stabilization.

In providing for the foregoing objects, the present invention utilizes carrier-type magnetic amplifiers of either the single core or plural core type, or of any other type having a D. C. component of output; and such amplifiers have their input and output interconnected via a non-linear feedback network. In a preferred form of the present invention, this non-linear feedback network includes a rectifier, which may take the form of a peak detector, whereby a feedback potential is coupled to an input or signal winding of the said amplifier having a magnitude substantially equal to that of the no-signal output of the amplifier. The circuit is further arranged so that this feedback potential is maintained for random duty cycle operation, and even with fairly high duty cycles. By proper poling of the rectifier mentioned previously the foregoing stabilization may further be effected in amplifiers capable of accepting either positive-going or negative-going input pulses; and in this respect it should further be noted that, as was mentioned previously, the amplifier may provide a maximum potential under no-signal conditions whereby a negative-going input pulse will tend to reduce the output, or the amplifier may provide a minimum output equal to or greater than zero under no-signal conditions, whereby a positive-going input signal will tend to increase the output potential of the amplifier. The present invention is applicable to either of these types of operation, and to amplifiers of either single or plural core construction, operating in these manners.

Figure 2:
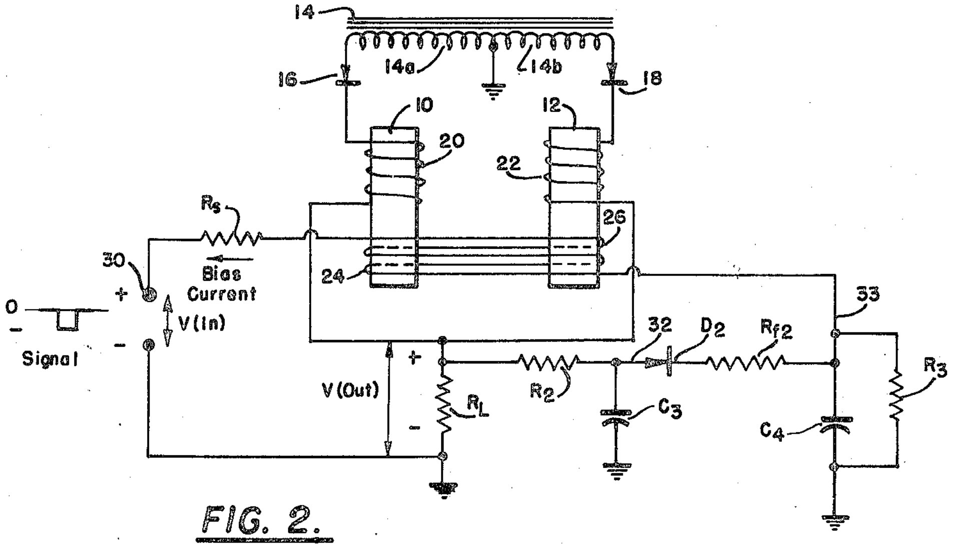

The foregoing objects, advantages, construction and operation of the present invention will become more readily apparent from the following description and accompanying drawings, in which:

Figure 1 is a schematic diagram of a stabilized magnetic amplifier in accordance with one form of the present invention arranged for the amplification of positive-going input signals; and Figure 2 is a schematic diagram of a carrier-type magnetic amplifier in accordance with an embodiment of the present invention arranged for amplifying negative-going input signals.

Referring now to Figure 1, and disregarding for the moment the operation of the feedback circuit shown, it will be seen that a carrier type magnetic amplifier, in accordance with one form of the present invention, may comprise a pair of magnetic cores 10 and 12 which preferably, but not necessarily, comprise magnetic materials exhibiting a substantially rectangular hysteresis loop. Such cores may be made of a variety of materials, among which are the various types of ferrites and various kinds of magnetic tapes, including Orthonik and 4–79 Molypermalloy. In addition, these materials may be given various heat treatments to produce various desired properties. The cores 10 and 12 may be constructed in a number of geometrical configurations, including both closed and open paths; but it is to be understood that the present invention is not limited to any specific core configuration nor to any specific hysteretic characteristics of the core materials.

Power may be supplied to the amplifier shown from a carrier frequency supply coupled to the primary winding of a transformer 14; and the secondary winding 14*a*—14*b* of the said transformer may in turn be coupled to power widings 20 and 22, carried respectively by the said cores 10 and 12, via rectifiers 16 and 18. The center-tap of the secondary winding of the said transformer 14 may in turn be grounded, as illustrated. The other ends of the said power windings 20 and 22 are coupled to a load impedance $R_L$, and one end of the said load impedance may also be grounded, as indicated, thereby to form a pair of series circuits including, respectively, the halves of the power transformer secondary winding 14*a* and 14*b*, rectifiers 16 and 18, power windings 20 and 22, and the load impedance $R_L$.

The cores 10 and 12 further carry signal windings 24 and 26, which signal windings may comprise a single continuous coil wound on both cores 10 and 12, as shown; or which may comprise separate windings connected in series. One end of the signal winding 24—26 is coupled to an input terminal 30, to which may be applied a selective input signal of a frequency substantially less than that of the carrier potential and the signal source coupled to terminal 30 and to the input winding 24—26 may further include a resistance $R_S$. In addition, the cores 10 and 12 may be biased from any suitable source of potential coupled to either the input or the output circuit of the amplifier, or coupled to the cores 10 and 12 by separate bias windings, thereby to predetermine the no-signal output potential of the said amplifier.

In the operation of the device shown (and assuming that core 12 is initially at its positive remanence operating point while core 10 is initially at its minus remanence operating point), when the carrier potential at the anode of rectifier 16 becomes positive with respect to ground (potential at the anode of rectifier 18 at this time being negative with respect to ground), current will flow from the carrier source through rectifier 16, coil 20, and the load impedance $R_L$, driving the core 10 to its plus remanence operating point and inducing a potential in the signal winding portion 26 via the signal winding portion 24, which drives the core 12 to its minus remanence operating condition. For this state of operation, there is a relatively large rate of change of flux through the winding 20, whereby the said power winding 20 exhibits a high impedance and little if any output appears across the load impedance $R_L$. During the next half cycle of carrier potential, when the potential at the anode of rectifier 16 becomes negative with respect to ground and the potential at the anode of rectifier 18 becomes positive with respect to ground, a further current will flow through the said rectifier 18 and coil 22 to the load impedance $R_L$. Inasmuch as the core 12 is now at its minus remanence point, this further current flow will similarly drive the said core 12 to its plus remanence operating condition; but inasmuch as the power winding 22 again exhibits a high impedance for this state of operation, relatively little output will appear across the load $R_L$. During this last-mentioned half cycle, the voltage induced in winding 26 and impressed on winding 24 operates to return core 10 to its negative remanence operating point. Hence, as long as no signal is coupled to the input terminal 30, in the arrangement shown in Figure 1, each of coils 20 and 22 will exhibit a high impedance to the applied carrier potentials and the cores 10 and 12 will be regularly driven about their hysteresis loops without producing an appreciable output across the load $R_L$. The actual magnitude of this no-signal potential across the load $R_L$ will, of course, depend upon the choice of bias potential coupled to the cores 10 and 12 in one of the manners discussed previously.

If now a positive-going input signal should be coupled from an input signal source to the terminal 30, this signal will tend to oppose the reverting effects of the induced current in signal winding 24—26 and the cores 10 and 12 will each be driven to saturation by current pulses flowing from the carrier potential source through the power windings 20 and 22. The said coils 20 and 22 will thereafter exhibit relatively low impedances to the carrier potential source, whereby appreciable currents will readily flow through the power windings to the load $R_L$. Thus, in the circuit thus far described, a carrier magnetic amplifier arrangement has been provided which provides a minimum output potential under no-signal conditions, and thus minimum output potential is in turn increased to a greater magnitude upon application of a positive-going signal input $V_{IN}$ at the terminal 30.

In a conventional amplifier, operating in accordance with the foregoing discussion, the end 27 of signal or input winding 24—26 is normally coupled to ground, whereby the power portions and signal portions of the amplifier arrangement are substantially independent of one another. In order to stabilize the zero signal output potential of the amplifier against changes in component values or supply voltage variations, however, a feedback network is interposed between the said end 27 of the winding 24—26 and the amplifier output. This feedback network is preferably non-linear in configuration and is designed to maintain a potential substantially equal to the filtered no-signal value of the amplifier output.

Thus, referring to the precise arrangement shown in Figure 1, it will be seen that a filter comprising an inductance L and a capacitor $C_1$ may be coupled across the load impedance $R_L$ whereby carrier frequency and carrier harmonic components are removed from outputs appearing across the said load impedance $R_L$ and appear in this filtered state at a point 28. A non-linear feedback network comprising a capacitor C2, a rectifier D1 and a resistor $R_{f_1}$ is coupled between the said filtered output point 28 and the end 27 of the signal or input winding 24—26; and the said resistance $R_{f_1}$ may in turn comprise either the forward resistance of the rectifier D1 or may take the form of a separate resistive component serving to reduce peak current in the rectifier D1.

The arrangement of the said capacitor C2 in combination with the rectifier D1 and resistance $R_{f_1}$, acts as a peak detector; and upon conduction of the said rectifier D1, the potential impressed across the capacitor C2 is substantially equal to the filtered potential appearing at the point 28. In operation, the rectifier D1 is so poled that it is normally conductive for a no-signal output appearing across the load $R_L$, and is rendered non-conductive when that output changes in response to the application of signal inputs at the terminal 30. Thus, inasmuch as the rectifier D1 is in a conductive state only for a no-signal output condition, the potential across the capacitor C2 is substantially equal to that no-signal output potential, and this potential is in turn impressed upon the signal or input winding 24—26 whereby it acts as a negative or degenerative feed-back thereto.

In the particular arrangement of components shown in Figure 1, the bias current flowing through winding 24—26 is in such a direction that in normal practice it would tend to disconnect the rectifier D1 under no-signal input conditions. This is prevented, however, by the arrangement of the resistor $R_1$ and the potential source E, the combination of which components acts as a current source tending to prevent rectifier D1 from disconnecting in the absence of signals; and in this respect, the magnitude of the potential source E is chosen to be slightly greater than the maximum no-signal value of $v_{OUT}$. It should further be noted that in the particular arrangement shown, the said potential source E is of proper polarity to supply the signal winding 24—26 with the bias currents discussed previously, provided the signal voltage source coupled to the terminal 30 will pass direct current. This potential source E may therefore be utilized alone or in conjunction with other potential sources to supply the desired bias current for maintaining the amplifier in a minimum output state for no-signal conditions. It should further be noted that the rectifier D1 employed in the non-linear feedback network, prevents positive pulses appearing across the load $R_L$ from changing the potential on capacitor C2 appreciably even with fairly high duty cycle operation of the amplifier. Thus, the potential across capacitor C2 remains substantially equal to that of the filtered no-signal output of the amplifier, and this potential is used to stabilize the zero-signal output voltage of the said amplifier.

The foregoing method of stabilization may also be effected in carrier type magnetic amplifiers designed to amplify negative-going signal inputs and one such arrangement is shown in Figure 2. The several amplifier components of this further arrangement which operate in accordance with the discussion previously given, bear numerals similar to those of the corresponding elements in Figure 1. However, inasmuch as the amplifier arrangement is now designed to maintain a maximum output under no-signal conditions, the bias sources employed should be modified accordingly. In effecting the stabilization, a filter R2—C3 is once more supplied, this filter comprising, for example, an RC filter rather than the LC filter previously utilized. Once more, a filtered output appears at a point 32 and a non-linear feedback network comprising a resistor $R_{f_2}$, a rectifier D2, and a capacitor C4, is interposed between the said filtered output point 32 and the end 33 of the signal or input winding 24—26. Since the arrangement is now adapted to produce a maximum output under no-signal conditions, however, the rectifier D2 is poled in a direction opposite to that of the rectifier D1, discussed in reference to Figure 1, whereby once more under no-signal conditions the rectifier D2 is conductive and impresses a potential across the capacitor C4 which is substantially equal to the no-signal output potential of the amplifier. As before, the application of a negative-going signal input at the terminal 30 will tend to change the magnitude of output appearing across the load $R_L$; but in the arrangement of Figure 2 this changed output represents a decreased output whereby, once more, the rectifier D2 tends to disconnect in response to the application of signal inputs at the terminal 30 thereby once more assuring that the potential across the feedback capacitor C4 is maintained at substantially that of the filtered no-signal output. A resistor R3 is further provided between the end 33 of signal or input winding 24—26 and ground, for the passage of bias current flowing through the said signal or input winding. Inasmuch as such bias current tends to maintain the conduction of the said rectifier D2 under no-signal conditions, the potential source E formerly employed, may now be dispensed with. By the same taken, the resistor R3, shown in Figure 2, is optional, inasmuch as bias currents may flow from ground through the load $R_L$ and thence through the rectifier D2 and the signal or input winding 24—26, rather than through the resistor R3. By the arrangement shown, therefore, a negative or degenerative feedback, substantially equal to the no-signal output of the amplifier, is once more imposed upon the signal or input winding 24—26, whereby the no-signal output state of the said amplifier is stabilized against changes in component values or supply voltage variations.

While preferred embodiments of the present invention have been discussed, it is to be understood that the foregoing is meant to be illustrative only and is not limitative of the present invention. The arrangements discussed previously, and modifications thereof, may be readily applied to magnetic amplifiers of both the single ended and plural core types, as well as to any other amplifier having a D. C. component of output. Many further variations will suggest themselves to those skilled in the art, and all such variations as are in accord with the principles discussed previously, are meant to fall within the scope of the present invention.

Having thus described our invention, we claim:

1. A magnetic amplifier circuit comprising a core of magnetic material having a power winding and a signal winding thereon, a source of alternating carrier potential coupled to one end of said power winding, load means coupled to the other end of said power winding, a source of selectively applied control signals coupled to one end of said signal winding, and means including a non-linear feedback network coupling the other end of said signal winding to said other end of said power winding.

2. The amplifier circuit of claim 1 wherein said feedback means includes capacitive means normally charged to substantially the no-signal output potential of said amplifier, said other end of said signal winding being connected to said capacitive means, and means including a rectifier coupling said capacitive means to said other end of said power winding.

3. The amplifier circuit of claim 2 wherein said last-named means includes filter means interposed between said rectifier and said other end of said power winding.

4. The amplifier circuit of claim 2 including potential means coupled to said rectifier for maintaining said rectifier in a conductive state in the absence of control signals from said signal source.

5. The amplifier circuit of claim 1 wherein said core comprises a magnetic material exhibiting a substantially rectangular hysteresis loop.

6. A magnetic amplifier circuit comprising a core of magnetic material having a power winding and a signal winding thereon, a source of carrier potential coupled to one end of said power winding, load means coupled to the other end of said power winding, a source of selectively applied signals coupled to one end of said signal winding for selectively controlling the flow of current from said carrier source to said load means via said power winding, and feedback means coupling the other end of said signal winding to said other end of said power winding, said feedback means including means maintaining a feedback potential substantially equal to the no-signal output potential of said amplifier.

7. The circuit of claim 6 wherein said last-named means comprises a capacitor, rectifier means coupling said capacitor to said load means, and means maintaining said rectifier in a conductive state in the absence of signals from said signal source.

8. The circuit of claim 7 including filter means between said rectifier means and said load means, whereby said capacitor maintains a charge potential substantially equal to the filtered no-signal output of said amplifier.

9. A magnetic amplifier circuit comprising a core of magnetic material having a power winding and a signal winding thereon, a source of carrier potential coupled to one end of said power winding, load means coupled to the other end of said power winding, a peak detector coupled to said load means, said peak detector including a capacitor maintaining a charge potential substantially equal to the no-signal output of said amplifier, and means coupling said signal winding to said capacitor.

10. The circuit of claim 9 including filter means between said peak detector and said other end of said power winding.

11. A magnetic amplifier circuit comprising a core of magnetic material having a power winding and a signal winding thereon, a source of carrier potential coupled to one end of said power winding, load means coupled to the other end of said power winding, a source of selectively applied control signals coupled to one end of said signal winding, and feedback means including a capacitor charged to substantially the no-signal output potential of said amplifier, the other end of said signal winding being coupled to said capacitor.

12. The circuit of claim 11 wherein said capacitor is coupled to said load means by a series connected rectifier and resistor, and means maintaining said rectifier in a conductive state in the absence of signals from said control signal source.

13. The circuit of claim 12 wherein said last-named means comprises an auxiliary potential source coupled to one end of said signal winding.

14. A magnetic amplifier circuit comprising a core of magnetic material having a power winding and a signal winding thereon, a source of carrier potential coupled to one end of said power winding, load means coupled to the other end of said power winding, a source of selectively applied control signals coupled to one end of said signal winding whereby said amplifier produces a predetermined no-signal output potential across said load means in the absence of said control signals, and produces a different output potential in response to application of said control signals, a non-linear feedback network comprising a capacitor coupled to said other end of said power winding via rectifier means, said rectifier means being so poled that it is conductive in response to the presence of said no-signal output and is non-conductive in response to said different output, and means coupling the other end of said signal winding to said capacitor.

15. The amplifier circuit of claim 14 wherein said control signals are positive-going in potential, said rectifier means having its anode coupled to said capacitor.

16. The amplifier circuit of claim 14 wherein said control signals are negative-going in potential, said rectifier means having its cathode coupled to said capacitor.

17. The amplifier circuit of claim 14 including filter means between said load means and said rectifier means for removing carrier frequency and carrier harmonic components from output potentials applied to said rectifier means.

18. A magnetic amplifier comprising two cores of magnetic material each of which has a power winding and a signal winding thereon, means coupling said signal windings in series with one another, means coupling one end of each of said power windings to a source of carrier potential, means coupling the other ends of said power windings to one another and to a load impedance, a source of selective control signals coupled to one end of said series connected signal windings, and a non-linear feedback network coupling the other end of said series connected signal windings to said other ends of said power windings, said feedback network including means maintaining a feedback potential substantially equal to the no-signal output potential of said amplifier.

19. The amplifier of claim 18 wherein said feedback network comprises a capacitor, and rectifier means coupling said capacitor to said load impedance, said rectifier means being conductive in the absence of control signals from said signal source and being rendered non-conductive in response to the presence of control signals from said signal source.

20. An amplifier having an input and an output, means selectively coupling control signals to said amplifier input whereby said amplifier produces a predetermined no-signal output potential in the absence of said control signals and said amplifier produces a different output potential in response to presence of said signals, potential storage means, rectifier means coupling said potential storage means to said amplifier output, said rectifier means being conductive in response to said no-signal output potential at said amplifier output and said rectifier being non-conductive in response to said different output potential whereby said storage means stores and maintains a potential substantially equal to the no-signal output potential of said amplifier, and means coupling said storage means to said amplifier input thereby to effect feedback between said output and said input.

21. An amplifier having an input and an output, means selectively coupling control signals to said input whereby said amplifier produces a no-signal output potential in the absence of said control signals and said amplifier produces a different output potential in response to presence of said signals, feedback means connected between said amplifier output and input, said feedback means including potential storage means, and rectifier means between said amplifier output and said storage means for disconnecting said storage means from said output when the output potential of said amplifier changes from said no-signal output potential to said different output potential.

22. An amplifier having an input, a source of control potential coupled to said amplifier input, said source including means responsive to a preselected output of said amplifier for determining the magnitude of said control potential, a source of input signals coupled to said amplifier input for selectively varying the output of said amplifier from said preselected output to a different output, and means for rendering said source of control potential nonresponsive to said different output whereby said control potential is maintained at the magnitude determined by said preselected output.

References Cited in the file of this patent

UNITED STATES PATENTS

| | | |
|---|---|---|
| 2,661,453 | Hemingway et al. | Dec. 1, 1953 |
| 2,713,674 | Schmitt | July 19, 1955 |
| 2,713,675 | Schmitt | July 19, 1955 |

UNITED STATES PATENT OFFICE

CERTIFICATE OF CORRECTION

Patent No. 2,830,197 April 8, 1958

Richard W. Spencer et al.

It is hereby certified that error appears in the printed specification of the above numbered patent requiring correction and that the said Letters Patent should read as corrected below.

Column 4, line 30, for "thus" read --this--.

Signed and sealed this 7th day of October 1958.

(SEAL)

Attest:

KARL H. AXLINE

Attesting Officer

ROBERT C. WATSON

Commissioner of Patents